US012679033B2

(12) United States Patent
Gomez

(10) Patent No.: US 12,679,033 B2
(45) Date of Patent: Jul. 14, 2026

(54) APPARATUS, METHOD, AND SYSTEM FOR TENSIONING RELEASE FILMS FOR 3D PRINTERS

(71) Applicant: Jaymi Lee Gomez, San Antonio, TX (US)

(72) Inventor: Jaymi Lee Gomez, San Antonio, TX (US)

(73) Assignee: Jaymi Lee Gomez, San Antonio, TX (US)

( * ) Notice: Subject to any disclaimer, the term of this patent is extended or adjusted under 35 U.S.C. 154(b) by 73 days.

(21) Appl. No.: 18/589,353

(22) Filed: Feb. 27, 2024

(65) Prior Publication Data

US 2025/0269598 A1      Aug. 28, 2025

(51) Int. Cl.
| | |
|---|---|
| *B29C 64/307* | (2017.01) |
| *B29C 31/00* | (2006.01) |
| *B29C 37/00* | (2006.01) |
| *B29C 64/30* | (2017.01) |
| *B33Y 40/00* | (2020.01) |

(52) U.S. Cl.
CPC .......... *B29C 64/307* (2017.08); *B29C 31/008* (2013.01); *B29C 37/0075* (2013.01); *B29C 64/30* (2017.08); *B33Y 40/00* (2014.12)

(58) Field of Classification Search
CPC ...................................................... B29C 64/30
See application file for complete search history.

(56) References Cited

U.S. PATENT DOCUMENTS

| | | | | |
|---|---|---|---|---|
| 6,367,791 B1 * | 4/2002 | Calderon | ................ | B29C 48/05 |
| | | | | 269/291 |
| 10,471,658 B2 * | 11/2019 | Swanson | ............... | B29C 64/118 |
| 10,828,833 B2 * | 11/2020 | Enslow | ................. | B33Y 30/00 |
| 10,967,573 B2 * | 4/2021 | Medalsy | .............. | B29C 64/245 |
| 11,465,352 B1 * | 10/2022 | Bircher | ................. | B29C 64/135 |
| 2011/0241947 A1 * | 10/2011 | Scott | ........................ | B22F 10/66 |
| | | | | 428/156 |
| 2012/0195994 A1 * | 8/2012 | El-Siblani | ............. | B29C 64/357 |
| | | | | 15/320 |
| 2013/0001834 A1 * | 1/2013 | El-Siblani | ............. | B29C 64/124 |
| | | | | 264/401 |
| 2014/0178585 A1 * | 6/2014 | Swanson | ................. | B05C 13/00 |
| | | | | 427/256 |
| 2015/0231831 A1 * | 8/2015 | El-Siblani | ............. | B29C 64/135 |
| | | | | 425/150 |

(Continued)

FOREIGN PATENT DOCUMENTS

GB            1065518 A  *  4/1967  ............. B29C 48/92

*Primary Examiner* — Timothy Kennedy
(74) *Attorney, Agent, or Firm* — Perkins Coie LLP; Michael Glenn; Vikram Iyengar

(57) ABSTRACT

Methods, systems, and apparatus for tensioning release film used with resin 3D printers are disclosed. A top and a bottom bracket with a release film positioned between them is removed from a resin vat. The old release film between the brackets is replaced with a new release film. The new release film is positioned between the top and bottom brackets and the top and bottom brackets and release film are positioned in a bottom insert. A top insert is applied to the bottom insert, top and bottom brackets, and release film, providing a tension to the release film. While under tension, the release film is secured to the top and bottom brackets. The top and bottom brackets and release film are returned to the vat.

19 Claims, 9 Drawing Sheets

(56)                  References Cited

U.S. PATENT DOCUMENTS

| | | | |
|---|---|---|---|
| 2016/0375693 A1* | 12/2016 | Okui ..................... | B29C 66/474 |
| | | | 251/61.1 |
| 2018/0029296 A1* | 2/2018 | Van Esbroeck ....... | B29C 64/286 |
| 2019/0030806 A1* | 1/2019 | Herman ................ | B29C 64/106 |
| 2019/0270243 A1* | 9/2019 | El-Siblani ............. | B29C 64/255 |
| 2020/0001525 A1* | 1/2020 | Wynne ................... | B33Y 50/02 |
| 2021/0146616 A1* | 5/2021 | Mansouri .............. | B29C 64/255 |
| 2022/0088868 A1* | 3/2022 | Duoss ................... | B33Y 40/00 |
| 2022/0161491 A1* | 5/2022 | Hu ........................ | B29C 64/321 |
| 2023/0182388 A1* | 6/2023 | Hui ........................ | B33Y 10/00 |
| | | | 425/472 |

* cited by examiner

400

402

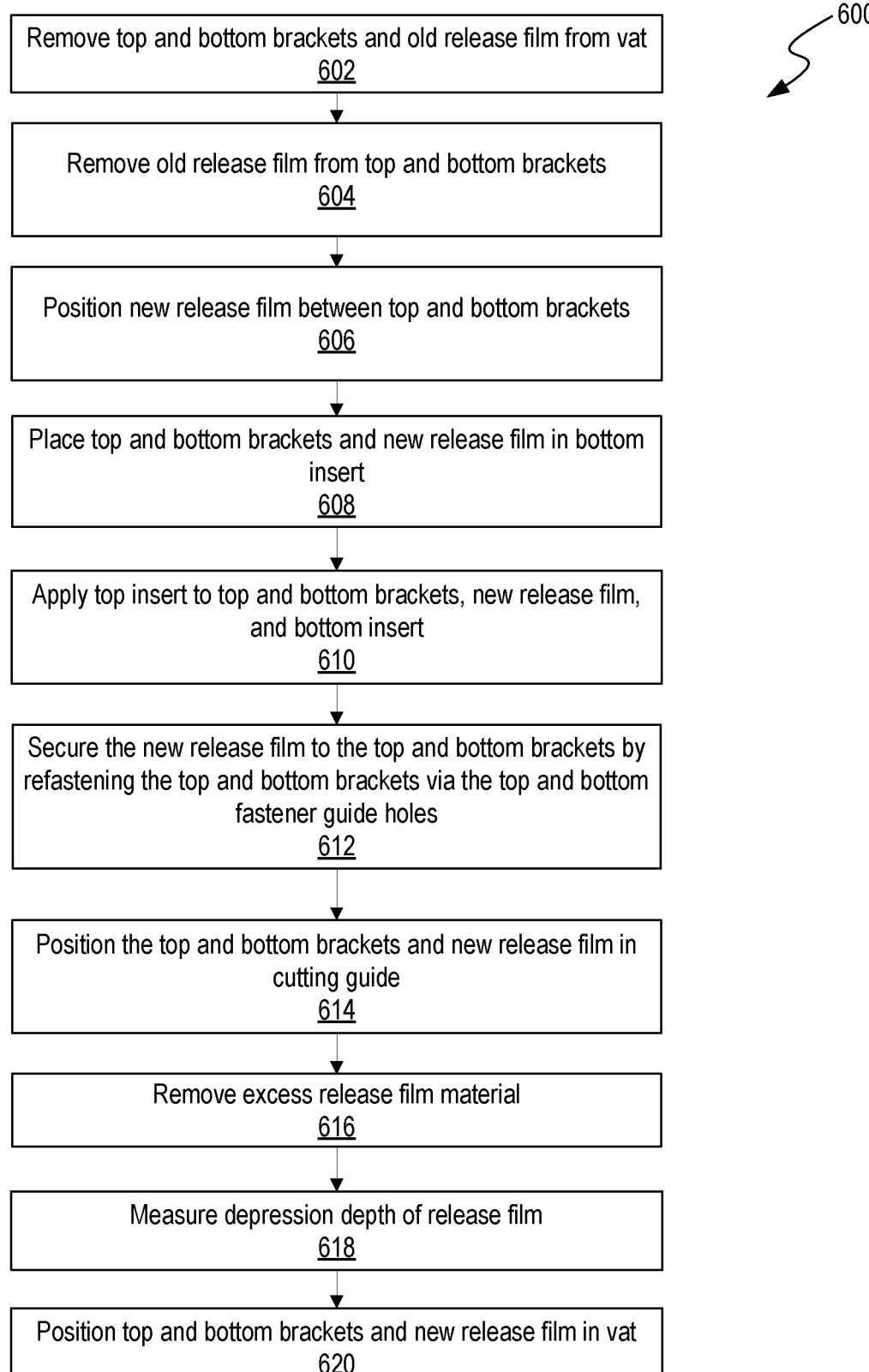

600

Remove top and bottom brackets and old release film from vat
602

Remove old release film from top and bottom brackets
604

Position new release film between top and bottom brackets
606

Place top and bottom brackets and new release film in bottom insert
608

Apply top insert to top and bottom brackets, new release film, and bottom insert
610

Secure the new release film to the top and bottom brackets by refastening the top and bottom brackets via the top and bottom fastener guide holes
612

Position the top and bottom brackets and new release film in cutting guide
614

Remove excess release film material
616

Measure depression depth of release film
618

Position top and bottom brackets and new release film in vat
620

*FIG. 6*

APPARATUS, METHOD, AND SYSTEM FOR TENSIONING RELEASE FILMS FOR 3D PRINTERS

TECHNICAL FIELD

The present technology relates generally to an apparatus, method, and system for 3D printing. More specifically, some embodiments are directed to an apparatus, method, and system for tensioning release films for 3D printers.

BACKGROUND

Resin three-dimensional (3D) printing is a type of Additive Manufacturing (AM) technology that builds three dimensional items by exposing liquid photopolymer resins to light, such as ultraviolet (UV) light or lasers. Various methods of resin 3D printing have become some of the most widespread and popular 3D printing technologies in both industrial applications and amongst consumers.

Some types of resin 3D printing technologies (e.g., stereolithography (SLA), liquid-crystal display (LCD), and digital light processing (DLP)) can involve placing a volume of liquid resin in a vat or tank with a release film (also referred to as a release liner or sheet) positioned at the bottom, with a light source positioned under the release film facing upward toward the resin. A build plate is then submerged in the resin to approximately the level of the release film. Light from the light source passes through the release film and interacts with the thin layer of resin between the release film and the submerged build plate, causing the resin to harden. After the layer is hardened, the build plate is at least partially withdrawn from the vat or tank, bringing with it the layer, and some of the remaining liquid resin fills in the space previously occupied by the build plate and now-hardened layer. The process is then repeated, as additional layers of hardened resin are added to the build plate with each iteration.

To ensure proper operation of many resin 3D printing technologies, the release film must be appropriately tensioned. However, this gives rise to a number of challenges, particularly since release films need to be periodically replaced and appropriately tensioned with each replacement.

BRIEF DESCRIPTION OF THE DRAWINGS

FIG. 6 is a flow diagram illustrating a process for release film tensioning in accordance with one or more embodiments.

DETAILED DESCRIPTION

Figure 1A:
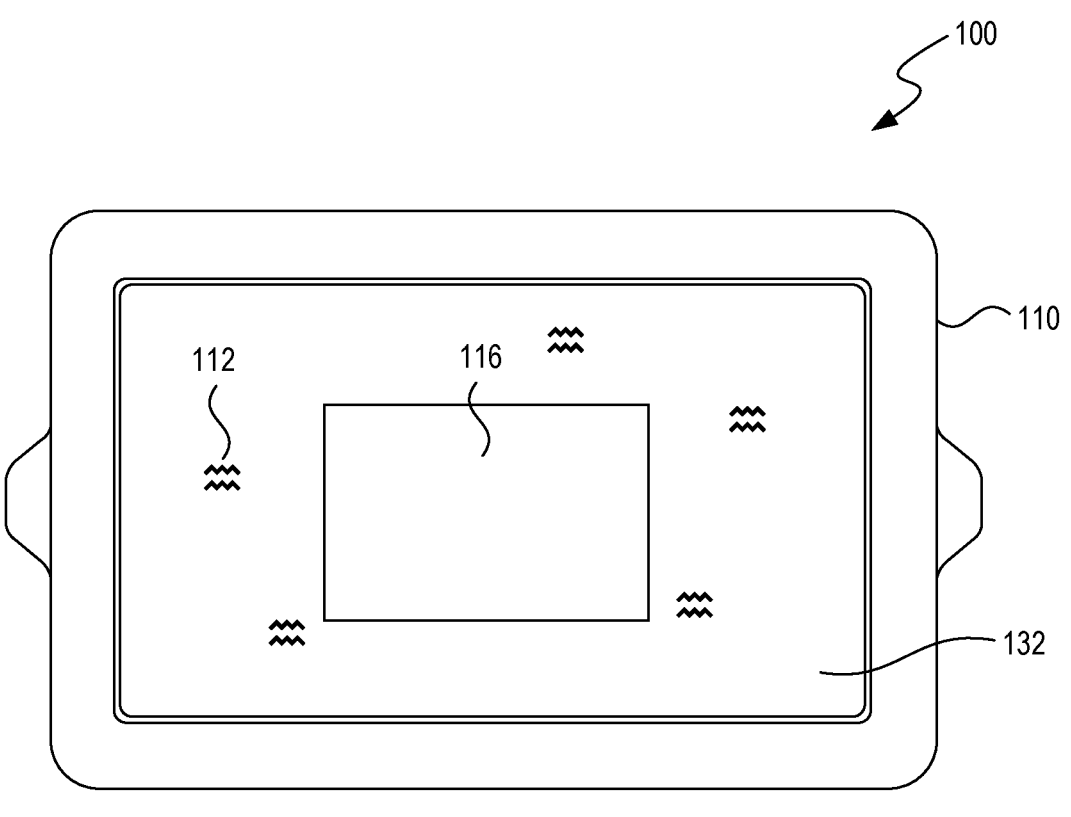
FIGS. 1A-1B are various perspective views of an example environment in which an example apparatus operates in accordance with one or more embodiments.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. All illustrations of the drawings are for the purpose of describing selected versions of the disclosure and are not intended to limit the scope of embodiments of the disclosure.

This document presents methods, systems, and apparatus for tensioning release film used with resin 3D printers. Successful operation of resin 3D printers requires proper tension of the release film. Release film that is improperly tensioned can result in damaged/imprecise prints, wasted resin, and can impair resin 3D printer operation. The disclosed technology provides methods, systems, and apparatuses for tensioning release film, thereby avoiding the damage and costs associated with improper tensioning.

The disclosed technology provides a tensioning apparatus that includes a top insert and a bottom insert configured to receive a top bracket and a bottom bracket. The top bracket and the bottom bracket are configured to receive a release film. When the release film is positioned between the top and bottom brackets, the top and bottom brackets are placed between the top and bottom inserts. The top insert includes a portion that presses on the release film between the top and bottom brackets, providing tension to the release film. While the release film is under tension, fasteners are applied through the top bracket, the release film, and the bottom bracket. The fasteners are then tightened to secure the release film in between the top and bottom brackets. The top and bottom inserts include fastener guide holes to facilitate fastening of the top and bottom brackets while they are positioned in the top and bottom inserts. Once the release film is secured, the top and bottom inserts are removed. The top and bottom brackets and release film are then positioned in a vat. In some embodiments, the top and bottom brackets and the release film are positioned in a cutting guide configured to assist with removing excess release film material prior to positioning in the vat. In some embodiments the apparatus includes a depth tool device used to measure the release film depression before positioning in the vat.

The advantages and benefits of the disclosed technology include providing a highly efficient, easily replicable, and precise system of tensioning release film. Currently, there are a wide variety of approaches for replacing release film, including stapling release film to a cardboard cutout before placement in a top and bottom bracket, or using bottle caps, playing cards, or pieces of foam or sponge to provide tension to the release film while being secured. However, these methods are imprecise, time consuming, and may result in a high rate of failed prints. The disclosed technology overcomes these challenges by providing an easily repeatable release film replacement process that maintains proper tension of the release film throughout positioning and securing between the top and bottom brackets. For example, the top insert provides a portion that can provide a uniform, standardized tension each time it is applied. This allows the user to efficiently and reliably replace and tension the release film in a relatively short period of time without needing subsequent tension measurement tests to verify tension.

In some embodiments, another example advantage is that fastener guide holes in the top and bottom inserts allow for securing the top and bottom brackets without having to remove the inserts and risk shifting of the release film relative to the brackets. This reduces release film replacement time by reducing the need to continuously reposition the release film or brackets throughout the replacement process. Furthermore, it decreases the potential introduction of undesired release film tension by removing the possibility of the release film or brackets shifting or being improperly positioned during replacement.

In some embodiments, another example advantage is that the cutting guide further reduces release film replacement time and simplifies the replacement process by providing a quick means of removing excess release film material prior to positioning in the vat.

Operation of the tensioning apparatus as disclosed herein causes a reduction in greenhouse gas emissions compared to traditional methods for tensioning release film. Every year, approximately 40 billion tons of $CO^2$ are emitted around the world. Power consumption by resin 3D printers can be substantial and will likely increase as industrial applications continue to expand. Many resin 3D printers have an energy consumption of approximately 0.12 kWh per layer. While the number of layers per print is highly variable, it is not uncommon to have prints with tens of thousands of layers, resulting in substantial energy consumption. This can greatly exacerbate the causes of climate change. For example, the average U.S. power plant expends approximately 600 grams of carbon dioxide for every kWh generated. The implementations disclosed herein for operating the tensioning apparatus can mitigate climate change by reducing and/or preventing additional greenhouse gas emissions into the atmosphere. For example, use of the tensioning apparatus to ensure print quality to avoid high rates of print failure, leading to unnecessary reprinting, as described herein reduces electrical power consumption and raw material waste, including wasted resin and release film. In particular, by providing a uniform, standardized tension system with fastener guide holes to minimize the possibility of release film shifting during the tensioning process, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Expanding the capabilities of resin 3D printers using the release film tensioning apparatus embodiments disclosed herein reduces the amount of data transported and stored and obviates the need for wasteful $CO^2$ emissions. Therefore, the disclosed implementations for operation of the release film tensioning apparatus mitigates climate change and the effects of climate change by reducing the amount of data stored and downloaded.

Figure 1B:
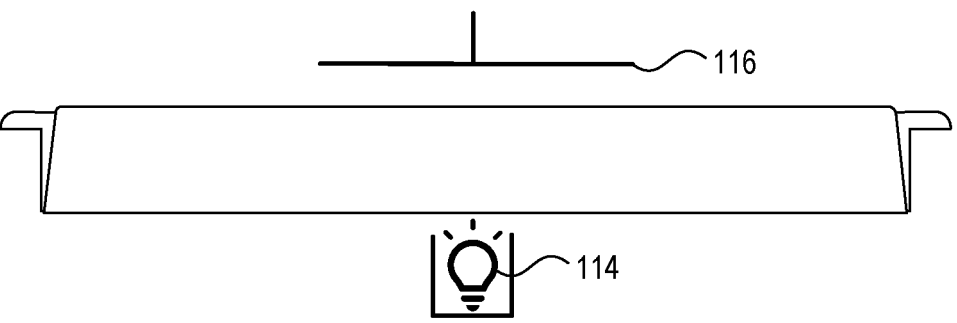

FIGS. 1A-1B are various perspective views of an example environment in which an example apparatus operates in accordance with one or more embodiments. Environment 100 includes a resin vat 110 in which liquid photopolymer resin 112 is received. The resin vat 110 has an open bottom to allow light from a light source 114 positioned below the resin vat 110 to interact with the resin. A release film 132 (discussed in more detail below with reference to FIGS. 1C-1D) is secured at the bottom of the resin vat 110 between a top bracket and a bottom bracket (not pictured, discussed in more detail below with reference to FIGS. 1C-1D) so as to form a barrier between the light source 114 and the resin 112. The liquid resin 112 sits on the release film 132. A build plate 116 is then submerged in the resin 112 to approximately the level of the release film 132. Light from the light source 114 passes through the release film 132 and interacts with a thin layer of resin between the release film 132 and the submerged build plate 116, causing the thin layer of resin to harden. After the layer is hardened, the build plate 116 is at least partially withdrawn from the vat 110, bringing with it the layer. Some of the remaining liquid resin 112 fills in the space previously occupied by the build plate 116 and now-hardened layer. The process is then repeated, as additional layers of hardened resin are added to the build plate 116 with each iteration.

Figure 1C:
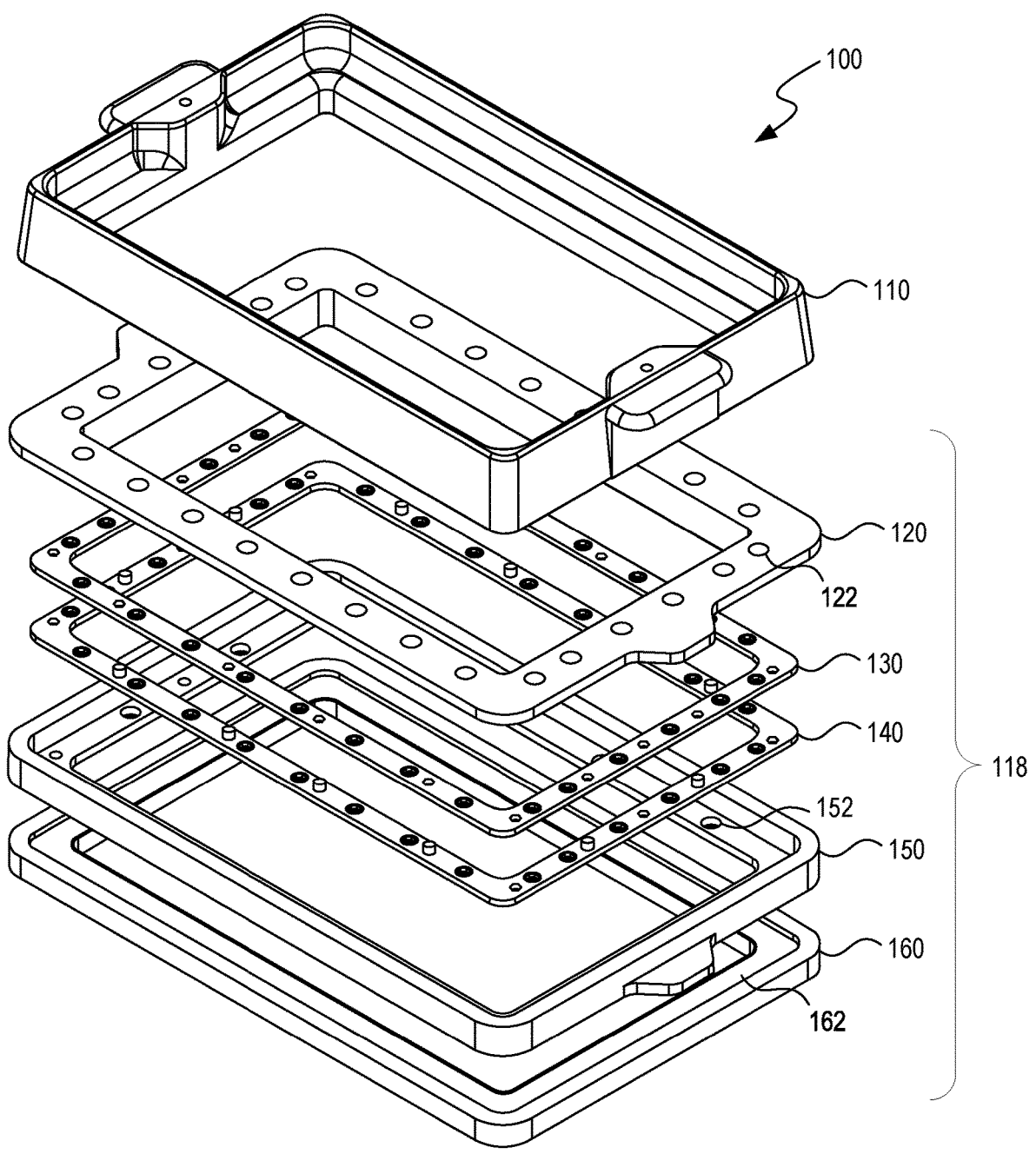
FIG. 1C is an exploded perspective view of an example environment and an example apparatus for release film tensioning in accordance with one or more embodiments.

FIG. 1C is an exploded perspective view of an example environment and an example apparatus for release film tensioning in accordance with one or more embodiments. Environment 100 (discussed in more detail above with reference to FIG. 1A-1B) includes a resin vat 110. In some embodiments, apparatus 118 includes a top insert 120, top fastener guide holes 122, a top bracket 130, a bottom bracket 140, a bottom insert 150, bottom fastener guide holes 152, and a cutting guide 160 configured with a flat surface 162. The resin vat 110 is configured to receive the top bracket 130, the bottom bracket 140, and a release film (not pictured) that is secured between the top bracket 130 and bottom bracket 140. Separately, the top insert 120 and the bottom insert 150 are also configured to receive the top bracket 130, the release film, and the bottom bracket 140. In some embodiments, the cutting guide 160 is configured to receive the top bracket 130, the release film, and the bottom bracket 140.

In some embodiments the top insert 120 and bottom insert 150 are configured to receive the top bracket 130, release film, and bottom bracket 140. The top insert 120 is configured to provide a tension to the release film while the release film is positioned between the top bracket 130 and bottom bracket 140, and while the top bracket 130 and bottom bracket 140 are positioned in the bottom insert 150. In some embodiments the top insert 120 includes a portion (not pictured, discussed in more detail with reference to FIGS. 1D and 2A-2B) configured to press the release film as the release film is held between the top bracket 130 and bottom bracket 140, thus providing the tension to the release film.

In some embodiments the top insert 120 and bottom insert 150 are configured to define top fastener guide holes 122 and bottom fastener guide holes 152, respectively. The top and bottom fastener guide holes 122, 152 are positioned on the top and bottom inserts 120, 150 so as to align with a plurality of fastener holes in the top and bottom brackets 130, 140. In some embodiments, the top fastener guide holes 122 comprise a first set of fastener guide holes, and the bottom fastener guide holes 152 comprise a second set of fastener guide holes. This allows the release film to be secured between the top and bottom brackets 130, 140 while the top and bottom brackets 130, 140 are positioned in the top and bottom inserts 120, 150 (i.e., while the top insert 120 is providing tension to the release film).

In some embodiments a cutting guide 160 is configured to receive the top bracket 130, release film, and bottom bracket 140. The top and bottom brackets 130, 140 and release film are positioned in the cutting guide 160, which is configured to provide a flat surface 162 to assist in removing excess release film material that extends beyond the edges of the top and bottom brackets 130, 140 (e.g., the excess release film can more easily be cut with a knife or scissors).

Figure 5A:
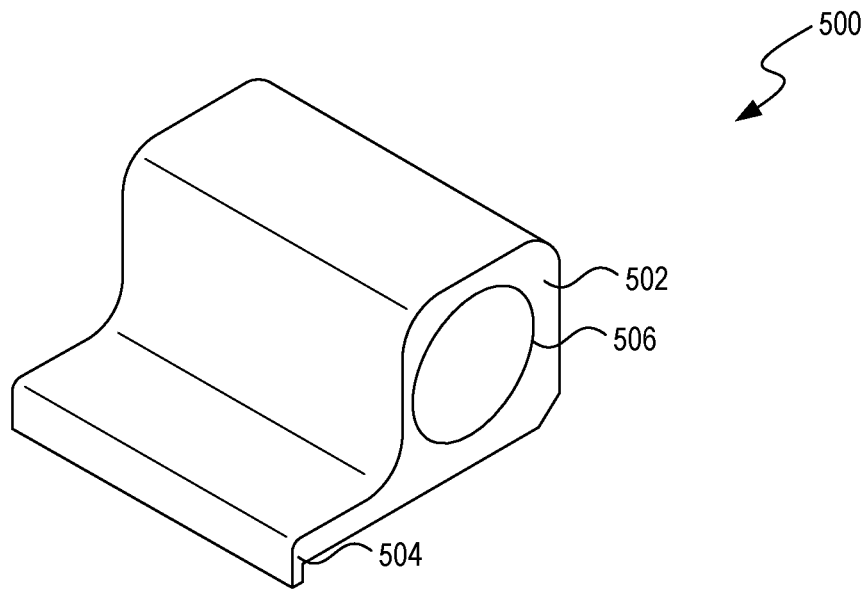
FIGS. 5A-5B are various perspective views of an example depth tool device for an example apparatus for release film tensioning in accordance with one or more embodiments.
Figure 5B:
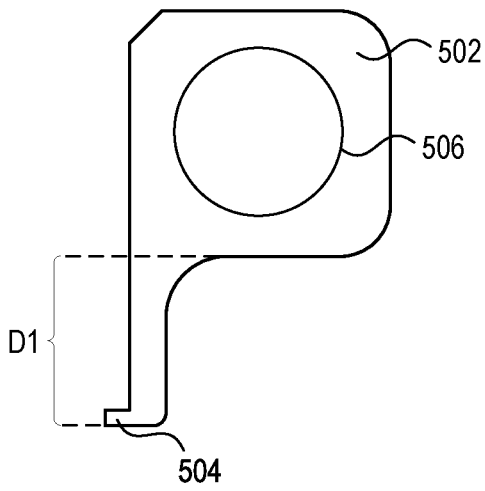

In some embodiments the apparatus includes a depth tool device (discussed further with reference to FIGS. 5A-5B). The depth tool device ensures that the release film has a desired tension by measuring the depression depth of the release film from the depth of the top insert. For example, in some embodiments, the depth tool device is shaped like the letter L, and assists in measuring a uniform depression depth distance of 7.25 millimeters (with a tolerance of +/−0.05 millimeters) from the top insert depth (e.g., the depth from the top of a first portion of the top insert to the bottom of a third portion of the top insert, discussed in more detail with reference to FIGS. 5A-5B). In some embodiments, the depth tool device is employed after removing excess release film material with the assistance of the cutting guide 160. In some embodiments, the depth tool device is employed after the top and bottom brackets 130, 140 are secured with the release film sandwiched between the brackets, while the brackets are positioned in the top and bottom inserts 120, 150.

Figure 1D:
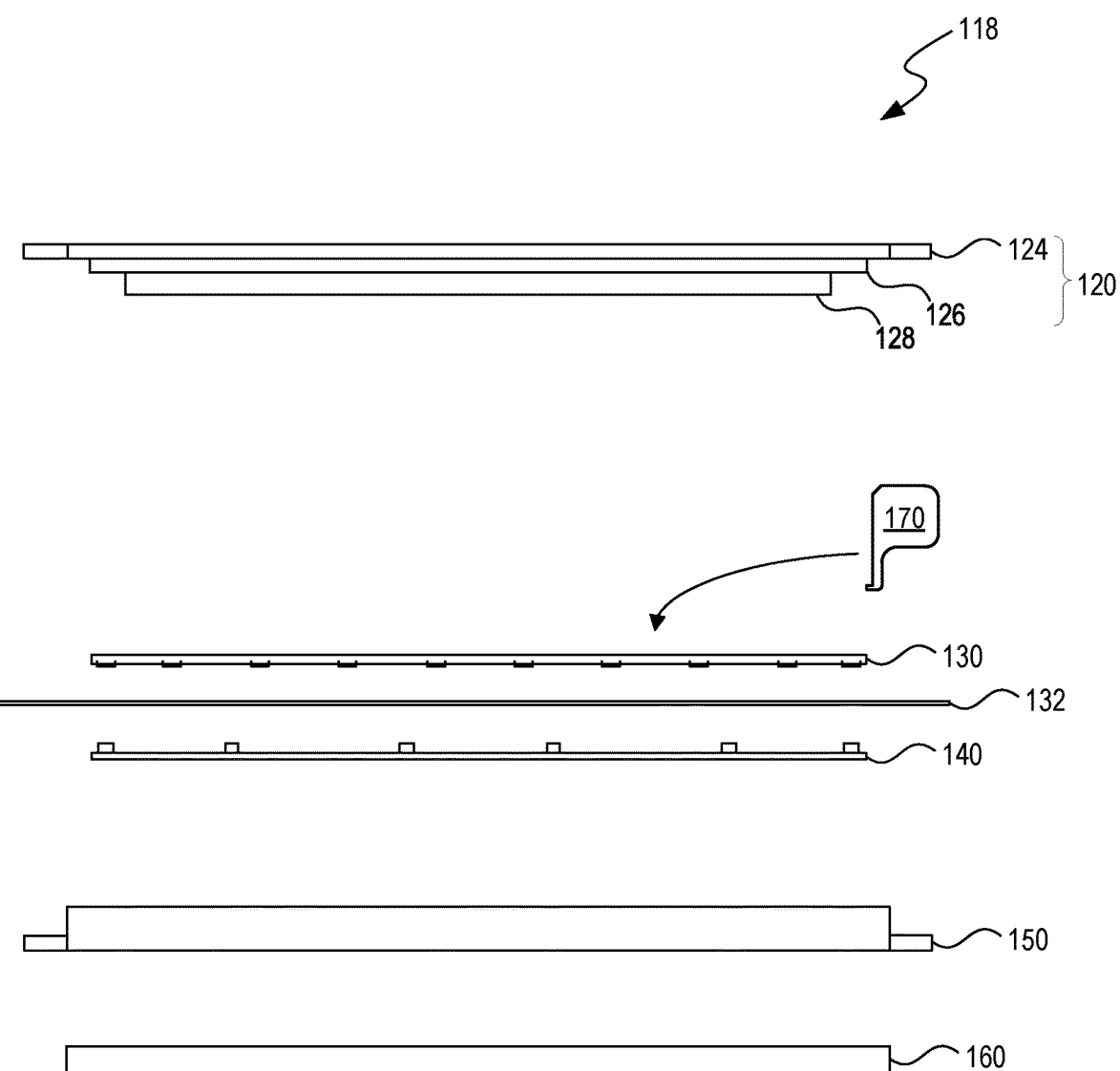
FIG. 1D is an exploded planar view of an example apparatus for release film tensioning in accordance with one or more embodiments.

FIG. 1D is an exploded planar view of an example apparatus for release film tensioning in accordance with one or more embodiments. Apparatus 118 is comprised of top insert 120, top bracket 130, a release film 132, bottom bracket 140, and bottom insert 150. In some embodiments apparatus 118 is further comprised of cutting guide 160. The release film 132 is positioned between the top bracket 130 and bottom bracket 140 prior to the top bracket 130, release film 132, and bottom bracket 140 being positioned in between the top insert 120 and bottom insert 150. In some embodiments, top insert 120 is configured to include a first portion 124, a second portion 126, and a third portion 128 (described in more detail with reference to FIGS. 2A-2B).

In some embodiments the first portion 124 and second portion 126 of top insert 120 are both configured to define fastener guide holes (e.g., 122 of FIG. 1C) that align with a plurality of the fastener holes of the top and bottom brackets 130, 140. For example, in some embodiments, the fastener guide holes are configured to span the first and second portions 124, 126, providing continuous fastener guide holes from a top surface of the first portion 124 to a bottom surface of the second portion 126. This allows the release film 132 to be secured in between the top and bottom brackets 130, 140 while the top and bottom brackets 130, 140 are positioned in the top and bottom inserts 120, 150. Thus, the release film 132 is secured to the top and bottom brackets 130, 140 while under tension.

In some embodiments, the release film 132 is comprised of a material with appropriate characteristics (e.g., high light transmittance, high durability) to facilitate resin 3D printing for any method of resin 3D printing. For example, in some embodiments, the release film 132 is a sheet of fluorinated ethylene propylene (FEP) material.

In some embodiments the apparatus includes a depth tool device 170. The depth tool device 170 ensures that the release film has a desired tension by measuring the depression depth of the release film from the depth of the top insert. For example, in some embodiments, the depth tool device

170 is shaped like the letter L, and assists in measuring a uniform depression depth distance of 7.25 millimeters (with a tolerance of +/−0.05 millimeters) from the top insert depth (e.g., the depth from a top edge of the first portion 124 to a bottom edge of the third portion 128). In some embodiments, the depth tool device 170 is employed after removing excess release film material with the assistance of a cutting guide 160. In some embodiments, the depth tool device 170 is employed after the top and bottom brackets 130, 140 are secured with the release film sandwiched between the brackets, while the brackets are positioned in the top and bottom inserts 120, 150.

Figure 2A:
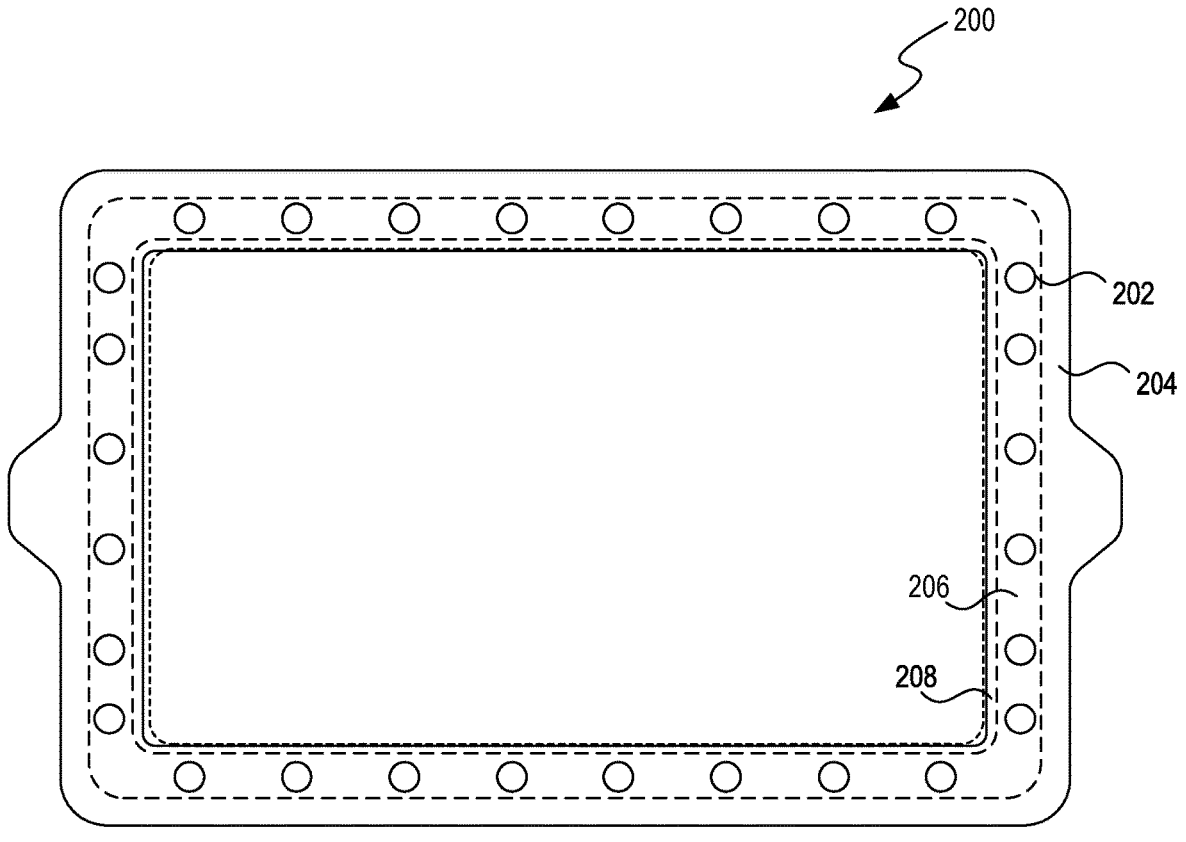
FIGS. 2A-2B are various perspective views of an example top insert for an example apparatus for release film tensioning in accordance with one or more embodiments.
Figure 2B:
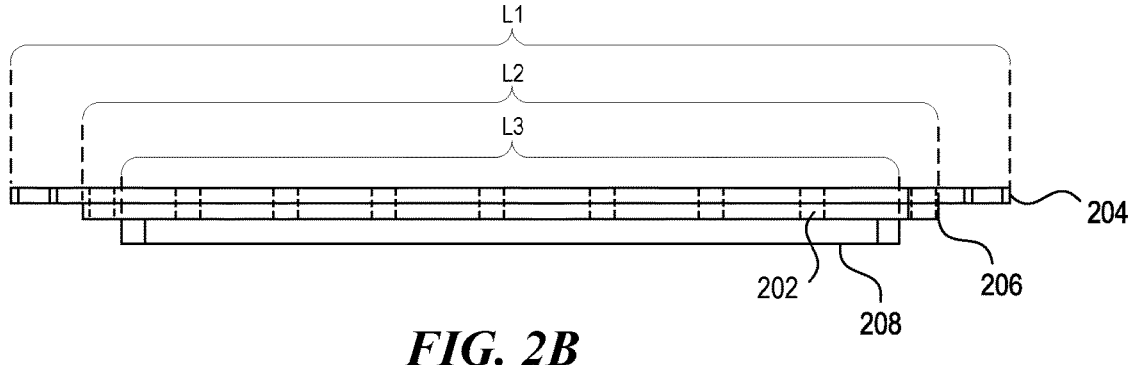

FIGS. 2A-2B are various perspective views of an example top insert for an example apparatus for release film tensioning in accordance with one or more embodiments. In some embodiments, top insert 200 is comprised of top fastener guide holes 202, a first portion 204, a second portion 206, and a third portion 208. The top insert 200 is configured to receive top and bottom brackets and a release film. The top fastener guide holes 202 are positioned to align with a plurality of the fastener holes of the top and bottom brackets (discussed above with reference to FIGS. 1A-1D). The top fastener guide holes 202 span the first portion 204 and the second portion 206. For example, in some embodiments, the fastener guide holes 202 span from a top surface of the first portion 204 to a bottom surface of the second portion 206, wherein the fastener holes of the top and bottom brackets are provided.

The third portion 208 of the top insert 200 is configured to press on the release film positioned between the top and bottom brackets, thus providing tension to the release film. For example, the release film (e.g., an FEP sheet) is positioned between the top and bottom brackets, and the top and bottom brackets and release film are positioned in the bottom insert. The top insert 200 is then positioned on top of the top and bottom brackets, release film, and bottom insert, such that the third portion 208 presses on the release film between the top and bottom brackets, providing tension to the release film. While the release film is under tension, fasteners are applied through the top fastener guide holes 202 and bottom fastener guide holes of the bottom insert (discussed below with reference to FIGS. 3A-3B) to the fastener holes of the top and bottom brackets.

In some embodiments, first portion 204 has a first length L1, second portion 206 has a second length L2, and third portion 208 has a third length L3. The first length L1, second length L2, and third length L3 are any appropriate size to fit the top and bottom brackets and release film of any commercial or industrial resin 3D printer (e.g., any size that suits manufacturer's specifications for top and bottom bracket and release film sizes). In some embodiments the second length L2 is less than the first length L1. In some embodiments the third length L3 is less than the first length L1 and the second length L2. For example, in some embodiments, the first length L1 is approximately about 260-410 millimeters, the second length L2 is approximately about 250-275 millimeters, and the third length L3 is approximately about 220-255 millimeters. As another example, in some embodiments, the first length L1 is approximately about 110-405 millimeters, the second length L2 is 95-367 millimeters, and the third length L3 is approximately about 70-328 millimeters. In other embodiments, one or more of the lengths are different.

Figure 3A:
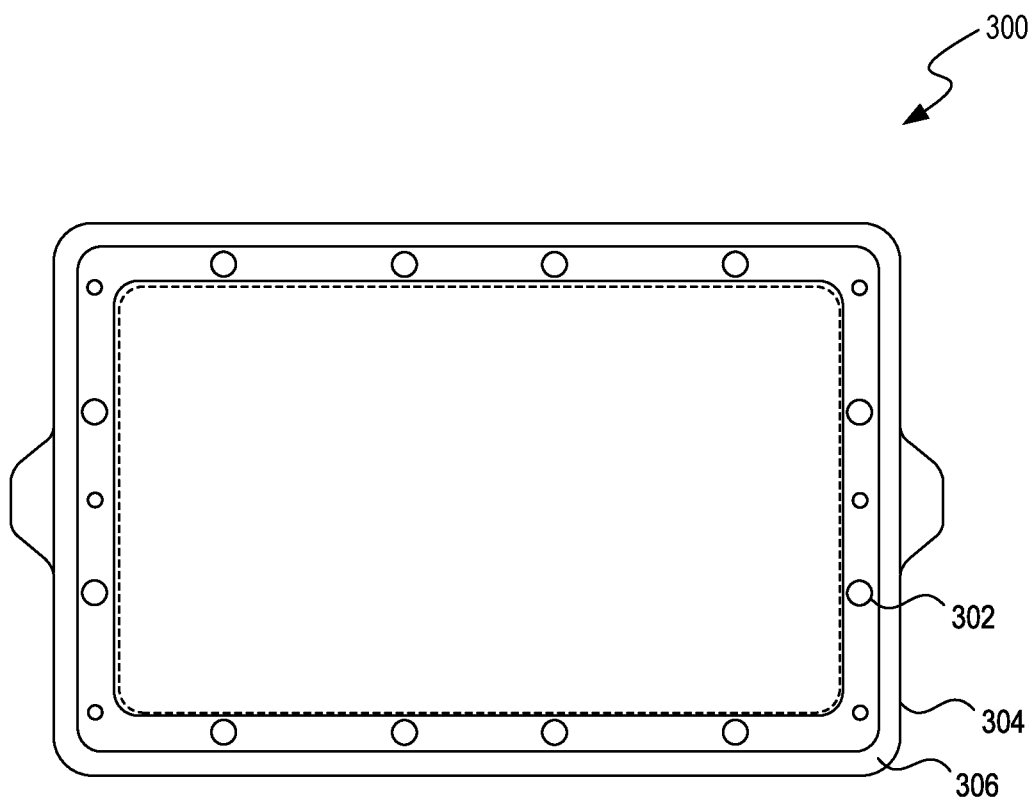
FIGS. 3A-3B are various perspective views of an example bottom insert for an example apparatus for release film tensioning in accordance with one or more embodiments.
Figure 3B:
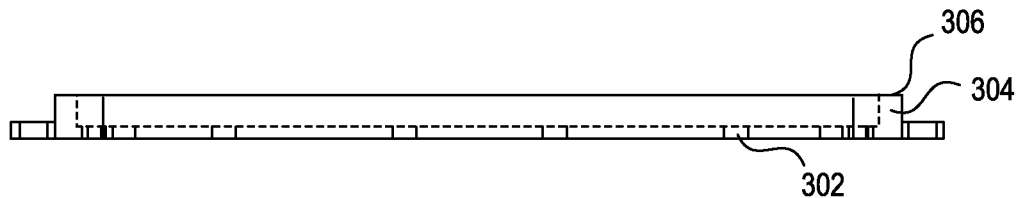

FIGS. 3A-3B are various perspective views of an example bottom insert for an example apparatus for release film tensioning in accordance with one or more embodiments. Bottom insert 300 is configured to receive the top and bottom brackets, release film, and top insert. In some embodiments, the bottom insert is further configured with bottom fastener guide holes 302 aligned with the fastener holes of the top and bottom brackets. For example, in some embodiments, the release film is positioned between the top and bottom brackets, and the top and bottom brackets and release film are then placed in the bottom insert 300. The top insert is then be positioned on the top and bottom brackets, release film, and bottom insert such that the third portion of the top insert presses on the release film, providing a tension to the film. While under tension, fasteners are applied to the top and bottom brackets through the top fastener guide holes and the bottom fastener guide holes 302 to secure the release film to the top and bottom brackets.

In some embodiments the bottom insert 300 includes a raised portion 304. The raised portion 304 is a structure that is configured to hold the top and bottom brackets in place while positioned in the bottom insert 300. For example, in some embodiments, the raised portion 304 provides a raised physical boundary within which the top and bottom brackets are placed, thus restricting movement of the top and bottom brackets. The raised portion 304 includes a first surface 306. When the top insert in positioned on top of the bottom insert 300, the first surface 306 supports the top insert by coming into physical contact with the first portion of the top insert.

Figure 4A:
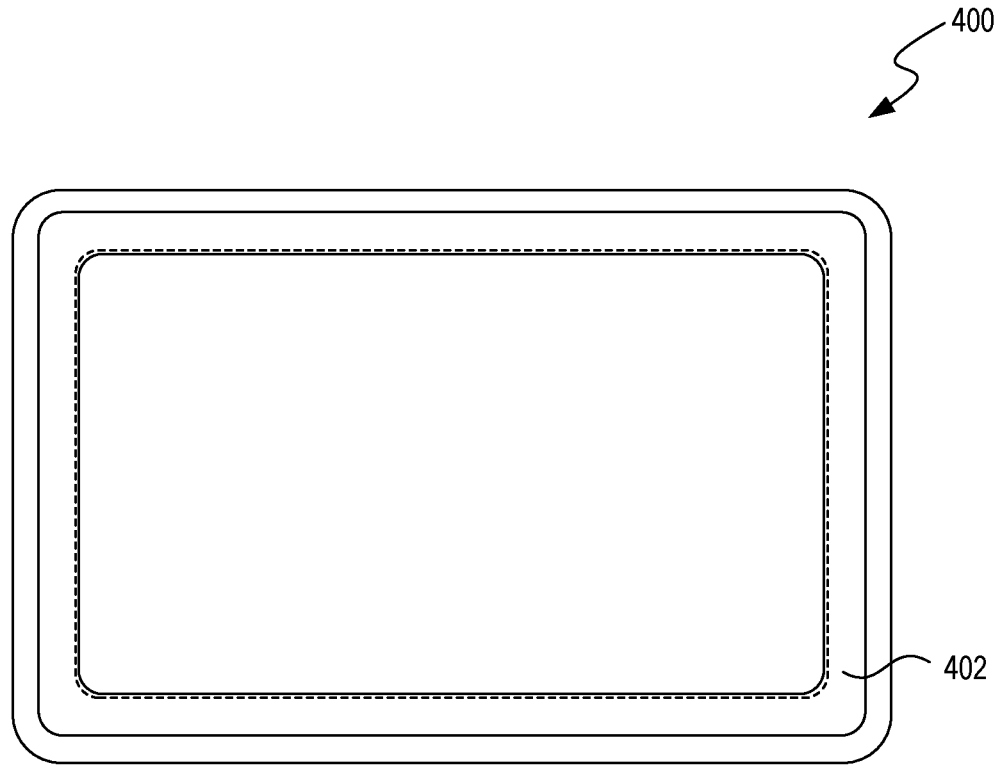
FIGS. 4A-4B are various perspective views of an example cutting guide for an example apparatus for release film tensioning in accordance with one or more embodiments.
Figure 4B:

FIGS. 4A-4B are various perspective views of an example cutting guide for an example apparatus for release film tensioning in accordance with one or more embodiments. Cutting guide 400 is configured to receive the top bracket and bottom brackets, and release film. The top and bottom brackets and release film are positioned in the cutting guide such that the cutting guide 400 provides a flat surface 402 to assist in removing excess release film material that extends beyond the edges of the top and bottom brackets (e.g., the user can more easily cut excess release film material with a knife or scissors). For example, once the release film is secured between the top and bottom brackets, the top and bottom inserts are removed, and the top and bottom brackets and release film are then positioned in the cutting guide 400. The flat surface 402 in the cutting guide 400 can be used to assist in removing excess release film material that extends beyond the edges of the top and bottom brackets.

FIGS. 5A-5B are various perspective views of an example depth tool device for an example apparatus for release film tensioning in accordance with one or more embodiments. Depth tool device 500 is comprised of a main body portion 502 and an L-shaped portion 504 extending from one end of the main body portion 502. In some embodiments, the depth tool device 500 is further comprised of one or more finger grips 506 positioned on a surface of the main body portion 502.

The depth tool device 500 ensures that the release film has a desired tension by measuring the depression depth of the release film from the depth of the top insert. For example, in some embodiments, the L-shaped portion 504 of the depth tool device 500 assists in measuring a uniform depression depth D1 from the top insert depth (e.g., the depth from the top of a first portion of the top insert to the bottom of a third portion of the top insert). In some embodiments, the depression depth D1 is approximately 7.25 millimeters (with a tolerance of +/−0.05 millimeters). In some embodiments, the depth tool device 500 is employed after removing excess release film material with the assistance of the cutting guide. In some embodiments, the depth tool device 500 is employed after the top and bottom brackets are secured with the release film sandwiched between the brackets, while the brackets are positioned in the top and bottom inserts.

FIG. 6 is a flow diagram illustrating a process for release film tensioning in accordance with one or more embodiments. In some embodiments, the process of FIG. 6 is performed by a mechanical manufacturing system or a robot. In other embodiments, at least some steps of the process of FIG. 6 are performed by a computer system. Likewise, embodiments can include different and/or additional steps, or perform the steps in different orders.

At 602, a top bracket, a bottom bracket, and an old release film secured between the brackets is removed from a vat. For example, in some embodiments, the top and bottom brackets and old release film are removed from the bottom of the vat. At 604, the old release film is removed from the top and bottom brackets. For example, fasteners securing the top and bottom brackets are removed so that the top and bottom brackets are physically separated from the old release film. At 606 a new release film is positioned between the top and bottom brackets. For example, in some embodiments, the new release film is sandwiched between the top and bottom brackets. At 608 the top and bottom brackets and new release film are placed in a bottom insert. In some embodiments the bottom insert is configured to include a raised portion that physically restrains the movement of the top and bottom brackets when positioned in the bottom insert.

At 610 a top insert is applied to the bottom insert, in which the top and bottom brackets and new release film are positioned. In some embodiments the top insert is supported by a first surface of a raised portion of the bottom insert when the top insert is applied to the bottom insert. In some embodiments the top insert is configured to include a portion that presses on the new release film, which is sandwiched between the top and bottom brackets, resulting in a tension on the new release film.

In some embodiments, the top insert is configured to include a first portion, a second portion, and a third portion. The third portion is configured to press on the release film positioned between the top and bottom brackets, thus providing tension to the release film. For example, the release film (e.g., an FEP sheet) is positioned between the top and bottom brackets, and the top and bottom brackets and release film are positioned in the bottom insert. The top insert is then positioned on top of the top and bottom brackets, release film, and bottom insert, such that the third portion presses on the release film between the top and bottom brackets, providing tension to the release film.

In some embodiments, the first portion has a first length L1, the second portion has a second length L2, and the third portion has a third length L3. The first length L1, second length L2, and third length L3 are any appropriate size to fit the top and bottom brackets and release film of any commercial or industrial resin 3D printer (e.g., any size that suits manufacturer's specifications for top and bottom bracket and release film sizes). In some embodiments the second length L2 is less than the first length L1. In some embodiments the third length L3 is less than the first length L1 and the second length L2. For example, in some embodiments, the first length L1 is approximately about 260-410 millimeters, the second length L2 is approximately about 250-275 millimeters, and the third length L3 is approximately about 220-255 millimeters. As another example, in some embodiments, the first length L1 is approximately about 110-405 millimeters, the second length L2 is 95-367 millimeters, and the third length L3 is approximately about 70-328 millimeters. In other embodiments, one or more of the lengths are different.

At 612 the new release film is secured to the top and bottom brackets while under tension. For example, in some embodiments, with the top insert in place, fasteners are applied to the top and bottom brackets via top fastener guide holes and bottom fastener guide holes in the top and bottom inserts, respectively. In some embodiments the top and bottom fastener guide holes are positioned on the top and bottom inserts so as to align with a plurality of fastener holes in the top and bottom brackets. In some embodiments, the top fastener guide holes comprise a first set of fastener guide holes, and the bottom fastener guide holes comprise a second set of fastener guide holes. This allows the release film to be secured between the top and bottom brackets while the brackets are positioned in the top and bottom inserts (i.e., while the top insert is providing tension to the release film). In some embodiments, the top fastener guide holes span the first portion and the second portion. For example, in some embodiments, the top fastener guide holes span from a top surface of the first portion to a bottom surface of the second portion, wherein the fastener holes of the top and bottom brackets are provided.

At 614 the top and bottom brackets and new release film (now secured to the top and bottom brackets and under tension) are removed from the top and bottom inserts. The top and bottom brackets and new release film are then positioned in a cutting guide. At 616 the cutting guide assists the user in removing excess release film material that extends beyond the edge of the top and bottom brackets. In some embodiments the cutting guide is configured to include a flat surface to assist in removing excess release film material.

At 618 the depression depth of the release film in relation to the depth of the top insert is measured. In some embodiments, a depth tool device is used to measure the depth depression of the release film. For example, in some embodiments, the depth tool device is shaped like the letter L, and assists in measuring a uniform depression depth distance of 7.25 millimeters (with a tolerance of +/−0.05 millimeters) from the top insert depth (e.g., the depth from a top edge of the first portion to a bottom edge of the third portion). In some embodiments, the measurement occurs after removing excess release film material with the assistance of the cutting guide. In some embodiments, the measurement occurs after the top and bottom brackets are secured with the release film sandwiched between the brackets, while the brackets are positioned in the top and bottom inserts. At 620 the top and bottom brackets and new release film (now under tension) are positioned back in the vat.

Figure 7:
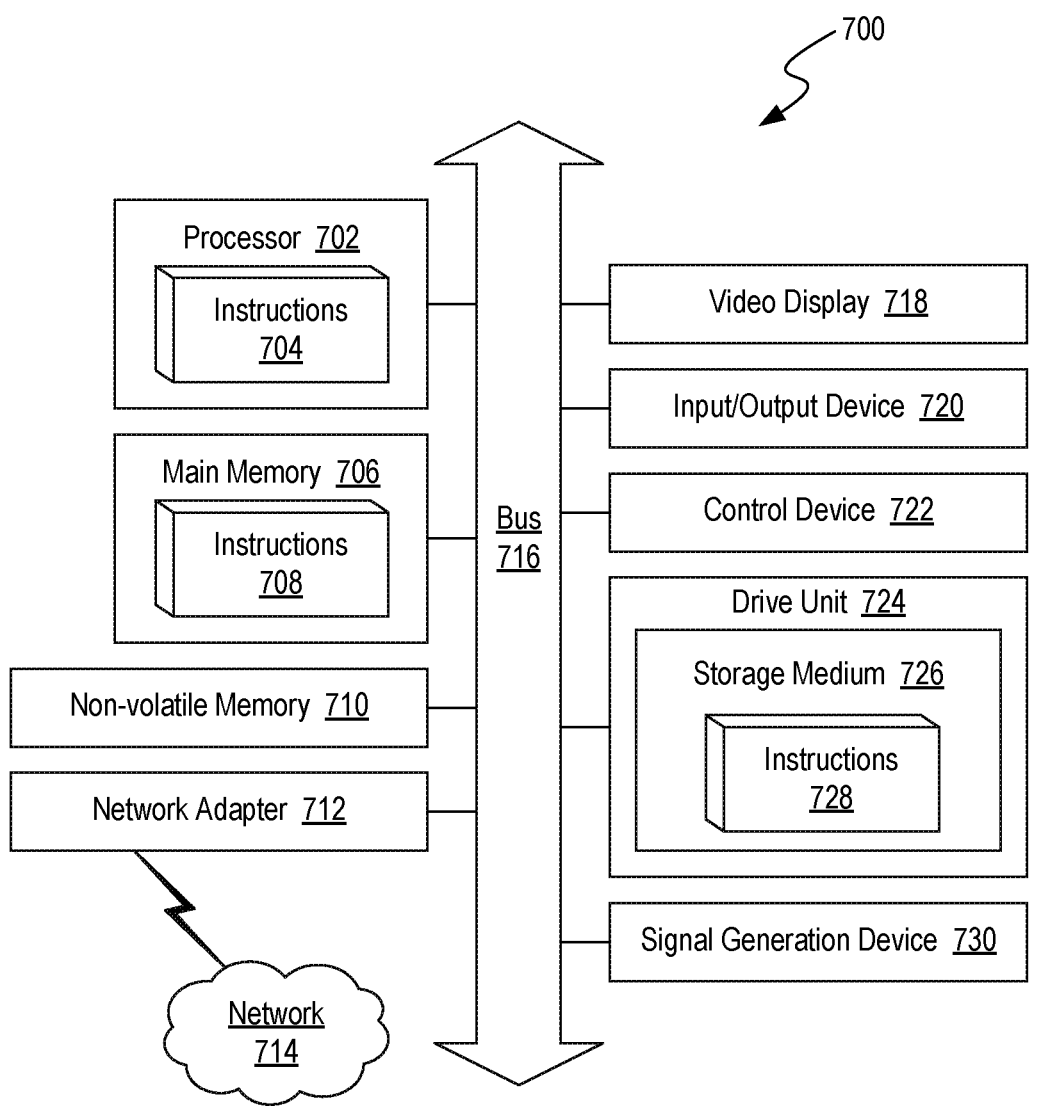
FIG. 7 is a block diagram illustrating an example computer system, in accordance with one or more embodiments.

FIG. 7 is a block diagram illustrating an example computer system, in accordance with one or more embodiments. At least some operations described herein can be implemented on the computer system 700.

In some embodiments, the computer system 700 includes one or more central processing units ("processors") 702, main memory 706, non-volatile memory 710, network adapters 712 (e.g., network interface), video displays 718, input/output devices 720, control devices 722 (e.g., keyboard and pointing devices), drive units 724 including a storage medium 726, and a signal generation device 720 that are communicatively connected to a bus 716. The bus 716 is illustrated as an abstraction that represents one or more physical buses and/or point-to-point connections that are connected by appropriate bridges, adapters, or controllers. In some embodiments, the bus 716, therefore, includes a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

In some embodiments, the computer system 700 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 700.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 728. The term "machine-readable medium" and "storage medium" shall also be taken to include any medium that is capable of storing, encoding, or carrying a set of instructions for execution by the computer system 700.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 704, 708, 728) set at various times in various memory and storage devices in a computer device. When read and executed by the one or more processors 702, the instruction(s) cause the computer system 700 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 710, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 712 enables the computer system 700 to mediate data in a network 714 with an entity that is external to the computer system 700 through any communication protocol supported by the computer system 700 and the external entity. In some embodiments, the network adapter 712 includes a network adapter card, a wireless network interface card, a router, an access point, a wireless router, a switch, a multilayer switch, a protocol converter, a gateway, a bridge, a bridge router, a hub, a digital media receiver, and/or a repeater.

In some embodiments, the network adapter 712 includes a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

It will be apparent to one with skill in the art of resin 3D printing that the release film tensioning apparatuses and systems disclosed are provided using some or all of the mentioned features and components without departing from the spirit and scope of embodiments of the disclosure. It will also be apparent to the skilled artisan that the embodiments described above are specific examples of a single broader disclosure that may have greater scope than any of the singular descriptions taught. For example, while some embodiments are applied to resin 3D printing techniques such as stereolithography (SLA), liquid-crystal display (LCD), and digital light processing (DLP), in some embodiments, the disclosure may also be applied to other resin 3D printing techniques. As another example, while the disclosure provides that the release film can be an FEP sheet, any other release film material used in resin 3D printing can be used. There may be many alterations made in the descriptions without departing from the spirit and scope of embodiments of the disclosure.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be the in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of embodiments and that various modifications can be implemented by those skilled in the art.

I claim:

1. An apparatus comprising:
a first insert including:
    a first portion including a first surface and a second surface opposite the first surface, the first portion defining a perimeter of the first insert;
    a second portion disposed on at least a portion of the second surface of the first portion; and
    a third portion in contact with the second portion and defining an opening of the first insert, the third portion extending away from the first and second portions;
    a first plurality of fastener guide holes defined by the first and second portions, wherein the first plurality of fastener guide holes extends through the first and second portions;
a first bracket;
a second bracket; and
a second insert configured to receive the first and the second brackets;
wherein the first and the second brackets are configured to receive a release film, and wherein the third portion of the first insert is configured to contact and provide a tension to the release film while the first and the second brackets are positioned in the second insert, and wherein the second insert defines a second plurality of fastener guide holes.

2. The apparatus of claim 1, wherein the second insert is further comprised of a raised portion, and wherein the raised portion is configured to hold the first and the second brackets in place while the first insert is being applied.

3. The apparatus of claim 1, wherein the apparatus further comprises a cutting guide, and wherein the cutting guide is configured to assist with removing excess release film material.

4. The apparatus of claim 1, wherein the apparatus further comprises a depth tool device, and wherein the depth tool device is configured to measure a depression depth of the release film.

5. A resin three-dimensional (3D) printer apparatus comprising:
a fluorinated ethylene propylene (FEP) sheet;
a first insert including:
    a first portion defining a perimeter of the first insert and including a first pair of diametrically opposing ends;
    a second portion in contact with the first portion and including a second pair of diametrically opposing ends; and
    a third portion in contact with the second portion and defining an opening of the first insert, the third portion including a third pair of diametrically opposing ends and extending away from the first and second portions;
    wherein the first portion and the second portion define a first set of fastener guide holes; and
    wherein the first, second, and third pairs of diametrically opposing ends form a staircase shape;
a first bracket;
a second bracket; and a second insert configured to receive the first and the second brackets;

wherein the first and the second brackets are configured to receive the FEP sheet, and wherein the third portion of the first insert is configured to contact and provide a tension to the FEP sheet while the first and the second brackets are positioned in the second insert, and wherein the second insert defines a second set of fastener guide holes.

6. The resin 3D printer apparatus of claim 5, wherein (a) the first portion is a first length, (b) the second portion is a second length, and (c) the third portion is a third length.

7. The resin 3D printer apparatus of claim 6, wherein the first length is greater than the second length, and wherein the first and the second lengths are each greater than the third length.

8. The resin 3D printer apparatus of claim 7, wherein the first length is 260-410 millimeters, the second length is 250-275 millimeters, and the third length is 220-255 millimeters.

9. The resin 3D printer apparatus of claim 5, wherein the second insert is further comprised of a raised portion, and wherein the raised portion is configured to hold the first and the second brackets in place while the first insert is being applied.

10. The resin 3D printer apparatus of claim 5, wherein the apparatus further comprises a cutting guide, and wherein the cutting guide is configured to assist with removing excess FEP sheet material.

11. The resin 3D printer apparatus of claim 5, wherein the apparatus further comprises a depth tool device, and wherein the depth tool device is configured to measure a depression depth of the FEP sheet.

12. A method of using a resin 3D printer apparatus, the method comprising:

positioning a fluorinated ethylene propylene (FEP) sheet between a first bracket and a second bracket, wherein the first bracket, the second bracket, and the FEP sheet are subsequently positioned in a bottom insert;

applying a top insert to the bottom insert, the first bracket, the second bracket, and the FEP sheet, wherein the top insert includes:

a first portion including a first surface and a second surface opposite the first surface, the first portion defining a perimeter of the top insert;

a second portion disposed on at least a portion of the second surface of the first portion; and a third portion in contact with the second portion and defining an opening of the top insert, the third portion extending away from the first and second portions;

wherein the first portion and the second portion define a first set of fastener guide holes and the bottom insert defines a second set of fastener guide holes, and wherein the third portion is configured to provide a tension to the FEP sheet; and securing the FEP sheet between the first bracket and the second bracket while the FEP sheet is under tension.

13. The method of claim 12, wherein (a) the first portion is a first length, (b) the second portion is a second length, and (c) the third portion is a third length.

14. The method of claim 13, wherein the first length is greater than the second length, and wherein the first and the second lengths are greater than the third length.

15. The method of claim 14, wherein the first length is approximately about 260-410 millimeters, the second length is approximately about 250-275 millimeters, and the third length is approximately about 220-255 millimeters.

16. The method of claim 12, wherein the bottom insert is further comprised of a raised portion, and wherein the raised portion is configured to hold the first and the second brackets in place while the top insert is being applied.

17. The method of claim 12, further comprising:

positioning the first bracket, the second bracket, and the FEP sheet in a cutting guide, wherein the cutting guide is configured to assist with removing excess FEP sheet material.

18. The method of claim 12, further comprising:

measuring a depression depth of the FEP sheet using a depth tool device.

19. The method of claim 12, further comprising:

reducing greenhouse gas emissions by reducing a number of failed prints compared to ad hoc systems of tensioning FEP sheets.

\* \* \* \* \*